United States Patent
Xu et al.

(10) Patent No.: US 11,404,698 B2
(45) Date of Patent: Aug. 2, 2022

(54) LIQUID METAL INTERFACIAL LAYERS FOR SOLID ELECTROLYTES AND METHODS THEREOF

(71) Applicant: GM GLOBAL TECHNOLOGY OPERATIONS LLC, Detroit, MI (US)

(72) Inventors: Jiagang Xu, Warren, MI (US);
Xingcheng Xiao, Troy, MI (US);
Robert D. Schmidt, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 288 days.

(21) Appl. No.: 16/668,904

(22) Filed: Oct. 30, 2019

(65) Prior Publication Data
US 2021/0135230 A1    May 6, 2021

(51) Int. Cl.
*H01M 4/62* (2006.01)
*H01M 10/0585* (2010.01)
(Continued)

(52) U.S. Cl.
CPC ........... *H01M 4/628* (2013.01); *H01M 4/366* (2013.01); *H01M 4/382* (2013.01);
(Continued)

(58) Field of Classification Search
CPC ...... H01M 4/628; H01M 4/366; H01M 4/382; H01M 10/0525; H01M 10/0562; H01M 10/0585; H01M 2300/0068
See application file for complete search history.

(56) References Cited

U.S. PATENT DOCUMENTS 8,496,855 B2   7/2013   Choi
8,974,946 B2   3/2015   Cai et al.
(Continued)

FOREIGN PATENT DOCUMENTS

CN   108470902 A   8/2018
CN   108493485 A   9/2018
(Continued)

OTHER PUBLICATIONS

Liu et al., Lithium Metal Anodes with an Adaptive "Solid-Liquid" Interfacial Protective Layer, Journal of the American Chemical Society, pp. A-F (Year: 2017).*
(Continued)

*Primary Examiner* — Jayne L Mershon
(74) *Attorney, Agent, or Firm* — Harness, Dickey & Pierce, P.L.C.

(57) ABSTRACT

Methods of making a solid-state electrochemical cell that cycles lithium ions are provided that include applying a liquid metal composition comprising gallium to a first major surface of either a solid-state electrolyte or a solid electrode (e.g., lithium metal) in the presence of an oxidant and in an environment substantially free of water to reduce surface tension of the liquid metal composition so that it forms a continuous layer over the first major surface. The first major surface having the continuous layer of liquid metal composition is contacted with a second major surface to form a continuous interfacial layer between the solid-state electrolyte and the solid electrode. Solid-state electrochemical cells formed by such methods are also provided, where the metal composition comprising gallium is a liquid in a temperature range of greater than or equal to about 20° C. to less than or equal to about 30° C.

20 Claims, 4 Drawing Sheets

(51) Int. Cl.
*H01M 10/0525* (2010.01)
*H01M 4/38* (2006.01)
*H01M 10/0562* (2010.01)
*H01M 4/36* (2006.01)

(52) U.S. Cl.
CPC ... *H01M 10/0525* (2013.01); *H01M 10/0562* (2013.01); *H01M 10/0585* (2013.01); *H01M 2300/0068* (2013.01)

(56) References Cited

U.S. PATENT DOCUMENTS

| | | |
|---|---|---|
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,318,738 B2 | 4/2016 | Kim et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 2007/0190415 A1 | 8/2007 | Sung et al. |
| 2012/0244418 A1* | 9/2012 | Cheng ............... H01M 10/0525 429/163 |
| 2013/0115513 A1 | 5/2013 | Choi et al. |
| 2015/0017535 A1 | 1/2015 | Hong et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0228975 A1 | 8/2015 | Lee et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0162859 A1 | 6/2017 | Yang et al. |
| 2017/0214079 A1 | 7/2017 | Dai et al. |
| 2017/0271678 A1 | 9/2017 | Yang et al. |
| 2017/0338522 A1* | 11/2017 | Hu ........................ H01M 50/46 |
| 2018/0294517 A1 | 10/2018 | Yersak et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0372155 A1 | 12/2019 | Yersak et al. |
| 2020/0052338 A1 | 2/2020 | Liu et al. |
| 2020/0127282 A1 | 4/2020 | Yersak et al. |
| 2020/0395630 A1 | 12/2020 | Yersak et al. |
| 2021/0083249 A1 | 3/2021 | Xiao et al. |
| 2021/0194046 A1* | 6/2021 | Nam ................ H01M 10/0562 |

FOREIGN PATENT DOCUMENTS

| | | |
|---|---|---|
| CN | 112751077 A | 5/2021 |
| DE | 102020125838 A1 | 5/2021 |
| WO | 2014182281 A1 | 11/2014 |
| WO | 2017045573 A1 | 3/2017 |

OTHER PUBLICATIONS

Yersak, Thomas A. et al., U.S. Appl. No. 15/992,878, filed May 30, 2018 entitled, "Methods of Manufacturing High-Active-Material-Loading Composite Electrodes and All-Solid-State Batteries Including Composite Electrodes," 55 pages.

Yersak, Thomas A. et al., U.S. Appl. No. 16/164,525, filed Oct. 18, 2018 entitled, "Low-Expansion Composite Electrodes for All-Solid-State Batteries," 53 pages.

Xiao, Xingcheng et al., U.S. Appl. No. 16/575,143, filed Sep. 18, 2019 entitled, "Additive to Ceramic Ion Conducting Material to Mitigate the Resistive Effect of Surface Carbonates and Hydroxides," 51 pages.

Han, Xiaogang et al., "Negating interfacial impedance in garnet-based solid-state Li metal batteries," Nature Materials 16, pp. 572-579 (Published online Dec. 19, 2016); DOI: 10.1038/nmat4821.

Sharafi, Asma et al., "Surface Chemistry Mechanism of Ultra-Low Interfacial Resistance in the Solid-State Electrolyte $Li_7La_3Zr_2O_{12}$," Chem. Mater. (29) 18, pp. 7961-7968; DOI: 10.1021/acs.chemmater. 7b03002 (Published Sep. 1, 2017).

Xu, Qin et al., "Effect of oxidation on the Mechanical Properties of Liquid Gallium and Eutectic Gallium-Indium," Physics of Fluids 24, 063101 (2012); DOI: 10.1063/1.4724313 (Published online Jun. 8, 2012).

* cited by examiner

LIQUID METAL INTERFACIAL LAYERS FOR SOLID ELECTROLYTES AND METHODS THEREOF

INTRODUCTION

This section provides background information related to the present disclosure which is not necessarily prior art.

Electrochemical energy storage devices, such as lithium-ion batteries, can be used in a variety of products, including automotive products, including for start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. In electrochemical cells, such as in lithium-ion batteries, one of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. For example, solid-state batteries include a solid-state electrolyte disposed between solid-state electrodes, where the solid-state electrolyte physically separates the electrodes and can serve as a separator and ionic conductor, so that a distinct separator is not required.

Solid-state batteries may have various performance advantages over conventional batteries that use liquid electrolytes, potentially including a wide voltage window, having good stability against lithium, and enhanced safety. However, establishing good contact between a solid electrolyte and solid electrode can be more challenging than in a battery with a liquid electrolyte and solid electrode. Thus, batteries that incorporate solid components may require high compressive pressures to maintain contact between components like the solid electrodes and solid-state electrolyte during battery operation. Furthermore, microscopic and macroscopic void spaces at surfaces between solid components may exist or arise over time after cycling, which may contribute to high interfacial impedance. Thus, it would be desirable to reduce interfacial impedance between electrodes and solid-state electrolyte in solid-state batteries.

SUMMARY

This section provides a general summary of the disclosure, and is not a comprehensive disclosure of its full scope or all of its features.

The present disclosure relates to a method of making a solid-state electrochemical cell that cycles lithium ions. The method optionally includes applying a liquid metal composition including gallium to a first major surface of either a solid-state electrolyte or a solid electrode in the presence of an oxidant and in an environment substantially free of water to reduce surface tension of the liquid metal composition so that it forms a continuous layer over the first major surface. The method further includes contacting the first major surface having the continuous layer of liquid metal composition with a second major surface of the other of the solid-state electrolyte or the solid electrode. The continuous layer defines an interfacial layer between the solid-state electrolyte and the solid electrode.

In one aspect, the solid-state electrolyte is heated prior to or during the applying.

In one aspect, the applying is a process selected from the group consisting of: thermal evaporation, doctor blade coating, and combinations thereof.

In one aspect, during the applying, a surface tension of the liquid metal composition is reduced to less than or equal to about 100 mN/m.

In one aspect, a contact angle of the liquid metal composition on the first major surface is less than or equal to about 90°.

In one aspect, a contact angle of the liquid metal composition on the first major surface is less than or equal to about 5°.

In one aspect, the interfacial layer has a thickness of greater than or equal to about 5 nm to less than or equal to about 20 micrometers.

In one aspect, the solid-state electrolyte includes a material selected from the group consisting of: $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), $Li_xLa_{2/3-x}TiO_3$, $Li_{1+x}Al_xTi_{2-x}(PO_4)_3$, $Li_{10}GeP_2S_{12}$, and combinations thereof and the solid electrode includes lithium.

In one aspect, the liquid metal composition including gallium is elemental gallium or an alloy of gallium and a metal selected from the group consisting of: tin, zinc, indium, bismuth, and combinations thereof.

In one aspect, the liquid metal composition including gallium is selected from the group consisting of: GaSn, GaInSn, $GaSn_8$, $GaSn_{12}$, $GaZn_5$, $Ga_{75}In_{25}$, $GaIn_{25}Sn_{13}$, $Ga_{69.8}In_{17.6}Sn_{12.6}$, $Ga_{62.5}In_{21.5}Sn_{16}$, $GaSn_{60}In_{10}$, $GaIn_{29}Zn_4$, $GaZn_{16}In_{12}$, $Ga_{66}In_{20.5}Sn_{13.5}$, $Ga_{66}In_{20.5}Sn_{13.5}$, $Ga_{61}In_{25}Sn_{13}Zn_1$, $GaIn_{15}Sn_{13}Zn_1$, $Ga_{66.4}In_{20.9}Sn_{9.7}Zn_3$, $Ga_{6.8}In_{21}Sn_{9.5}Bi_{1.5}$, $Ga_{6.8}In_{21}Sn_{9.5}Bi_{0.75}Zn_{0.75}$, and combinations thereof.

The present disclosure further relates to a solid-state electrochemical cell that cycles lithium ions. The electrochemical cell may include a solid-state electrolyte defining a first major surface. The electrochemical cell may also include a solid electrode including an electroactive material and defining a second major surface. An interfacial layer is disposed between and coextensive with the first major surface of the solid-state electrolyte and the second major surface of the solid electrode. The interfacial layer is formed of a metal composition including gallium that is a liquid in a temperature range of greater than or equal to about 20° C. to less than or equal to about 30° C.

In one aspect, the solid electrode includes lithium metal.

In one aspect, the solid-state electrolyte includes a material selected from the group consisting of: $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), $Li_xLa_{2/3-x}TiO_3$, $Li_{1+x}Al_xTi_{2-x}(PO_4)_3$, $Li_{10}GeP_2S_{12}$, and combinations thereof and the solid electrode includes lithium.

In one aspect, the interfacial layer has a thickness of greater than or equal to about 5 nm to less than or equal to about 20 micrometers.

In one aspect, the interfacial layer has a resistivity of less than or equal to about 2 Ohm/cm$^2$.

In one aspect, exposed surfaces of the interfacial layer include metal oxides.

In one aspect, the metal composition including gallium is selected from the group consisting of: GaSn, GaInSn, GaSn$_8$, GaSn$_{12}$, GaZn$_5$, Ga$_{75}$In$_{25}$, GaIn$_{25}$Sn$_{13}$, Ga$_{69.8}$In$_{17.6}$Sn$_{12.6}$, Ga$_{62.5}$In$_{21.5}$Sn$_{16}$, GaSn$_{60}$In$_{10}$, GaIn$_{29}$Zn$_4$, GaZn$_{16}$In$_{12}$, Ga$_{66}$In$_{20.5}$Sn$_{13.5}$, Ga$_{66}$In$_{20.5}$Sn$_{13.5}$, Ga$_{61}$In$_{25}$Sn$_{13}$Zn$_1$, GaIn$_{15}$Sn$_{13}$Zn$_1$, Ga$_{66.4}$In$_{20.9}$Sn$_{9.7}$Zn$_3$, Ga$_{6.8}$In$_{21}$Sn$_{9.5}$Bi$_{1.5}$, Ga$_{6.8}$In$_{21}$Sn$_{9.5}$Bi$_{0.75}$Zn$_{075}$, and combinations thereof.

In one aspect, the interfacial layer including the metal composition is substantially free of any other components.

In one aspect, the temperature range is greater than or equal to about −20° C. to less than or equal to about 150° C.

The present disclosure also further relates to a solid-state electrochemical cell that cycles lithium ions. The electrochemical cell includes a solid-state electrolyte defining a first major surface and an opposite second major surface. The solid-state electrochemical cell also includes a negative solid electrode including a negative electroactive material and defining a third major surface. A positive solid electrode including a positive electroactive material and defining a fourth major surface. A first interfacial layer is disposed between and coextensive with the first major surface of the solid-state electrolyte and the third major surface of the negative solid electrode. A second interfacial layer is disposed between and coextensive with the second major surface of the solid-state electrolyte and the fourth major surface of the positive solid electrode. The first interfacial layer and the second interfacial layer are formed of a metal composition including gallium that is a liquid in a temperature range of greater than or equal to about 20° C. to less than or equal to about 30° C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
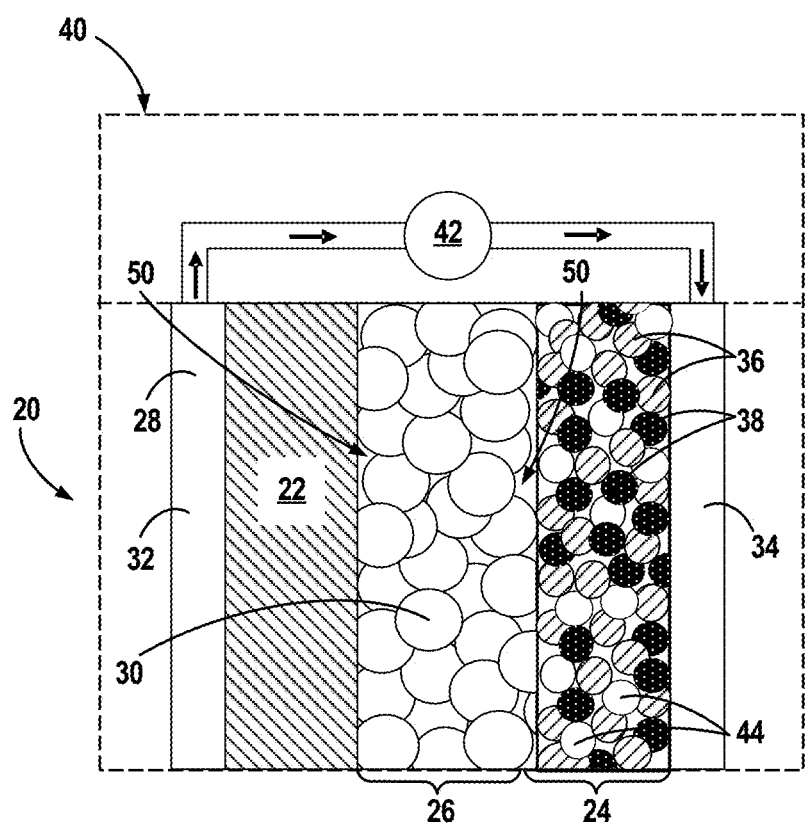
FIG. 1 is an illustration of an example of a solid-state battery.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to"

another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Lithium-ion batteries that include a negative electrode or anode comprising lithium metal are promising in that lithium metal has a high theoretical specific capacity of about 3,860 mAh/g, a low density of about 0.53 g/cm$^3$, and a low negative electrochemical potential of about −3.04 V versus a standard hydrogen electrode. However, lithium metal anodes may be subject to high reactivity and large volume changes that can lead to dendrite growth, a mossy structure, and low cycle efficiency. Furthermore, as discussed above, solid-state batteries incorporating solid electrodes, like lithium negative electrodes, can exhibit high interfacial impedance due to poor contact between the solid lithium with solid electrolyte materials. In various aspects, the present disclosure provides method of forming electrochemical cells that cycle lithium ions that have reduced interfacial impedance between a solid electrode, like a lithium electrode, and solid electrolyte, by incorporating a thin layer of liquid metal between the solid electrode and the solid electrolyte. The liquid metal compositions may comprise gallium (Ga). In the past, difficulties in wetting out such liquid metal compositions over major surfaces of solid lithium-based electrodes posed challenges, resulting in the inability to form layers or coating. However, as discussed herein, the present methods provide techniques for reducing surface tension of the liquid metal to facilitate forming thin metal interfacial layers from the liquid metal composition that fill in surface voids in the solid electrolyte and/or solid electrode and thus create intimate interfacial contact, facilitate charge transfer, and reduce the interfacial impedance. The electrode of the opposite polarity may be in a variety of forms, including liquid, gas, semi-solid, or solid. The electrode may be in a solid or semi-solid state and comprise a liquid electrolyte, as well. Where the electrode of the opposite polarity is in a solid form, a solid-state lithium electrochemical cell is provided.

An exemplary and schematic illustration of an electrochemical cell 20 (also referred to herein as "the battery"), i.e., a lithium ion cell, that cycles lithium ions is shown in FIG. 1. Notably, the components shown in the electrochemical cell 20 are not to scale. Unless specifically indicated otherwise, the term "ions" as used herein refers to lithium ions, but in alternative aspects, may also refer to other ions, such as sodium ions. The battery 20 includes a negative electrode 22, a positive electrode 24, and a solid-state electrolyte 26 disposed between the electrodes 22, 24. The solid-state electrolyte 26 is both a separator that physically separates the negative electrode 22 from the positive electrode 24 and an ion-conducting electrolyte. The solid-state electrolyte 26 may be defined by a plurality of solid-state electrolyte particles 30. A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). As shown, the negative electrode 22 may be a solid film comprising an electroactive material 28, while the positive electrode 24 may be a composite electrode that comprises a plurality of electroactive material particles 36, either a liquid or solid electrolyte 44 (shown as solid electrolyte particles), and optionally a plurality of electrically conductive particles 38.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Ions, which are also produced at the negative electrode 22, are concurrently transferred through the solid-state electrolyte 26 towards the positive electrode 24. The electrons flow through the external circuit 40, and the ions migrate across the solid-state electrolyte 26 to the positive electrode 24 where they may be plated, reacted, or intercalated. The electric current passing through the external circuit 40 can be harnessed and directed through the load device 42 (in the direction of the block arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across the solid-state electrolyte 26 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In many of the configurations of the battery 20, each of the negative electrode current collector 32, the negative electrode 22, the solid-state electrolyte 26, the positive electrode 24, and the positive electrode current collector 34 are prepared as relatively thin layers (for example, from several microns to a millimeter or less in thickness) and assembled in layers connected in parallel arrangement to provide a suitable electrical energy and power package. In various other instances, the battery 20 may include electrodes 22, 24 that are electrically connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the solid-state electrolyte 26, by way of non-limiting example. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

With further reference to FIG. 1, the solid-state electrolyte 26 provides electrical separation-preventing physical contact-between the negative electrode 22, i.e., an anode, and the positive electrode 24, i.e., a cathode. The solid-state electrolyte 26 also provides a minimal resistance path for internal passage of ions. In various aspects, as noted above, the plurality of solid-state electrolyte particles 30 may define the solid-state electrolyte 26. In certain aspects, the solid-state electrolyte particles 30 comprise a ceramic oxide, such as garnet type $Li_aLa_bZr_cO_d$ materials, like $Li_7La_3Zr_2O_{12}$ (LLZO), $Li_xLa_yTiO_3$ where $0<x<1$ and $0<y<1$ (LLTO), $Li_{1+x}Al_xTi_{2-x}PO_4$ where $0<x<1$ and $0<y<2$ (LATP), $Li_{2+2x}Zn_{1-x}GeO_4$ where $0<x<1$ (LISICON), $Li_2PO_2N$ (LIPON), $Li_xLa_{2/3-x}TiO_3$, $Li_{1+x}Al_xTi_{2-x}(PO_4)_3$, or sulfides, like $Li_{10}GeP_2S_{12}$, and combinations thereof, as non-limiting examples. In certain embodiments, the solid-state electrolyte particles 30 optionally comprise a dopant. Solid electrolyte materials may be selected to be stable in the presence of certain electroactive materials, like lithium, such as a garnet-type material, like $Li_7La_3Zr_2O$ (LLZO).

The solid-state electrolyte 26 may be in the form of a layer or a composite that comprises the first plurality of solid-state electrolyte particles 30. For example, the solid-state electrolyte 26 may be in the form of a layer having a thickness greater than or equal to about 1 μm to less than or equal to about 1 mm, and in certain aspects, optionally greater than or equal to about 1 μm to less than or equal to about 100 μm. Such solid-state electrolytes 26 after processing into a consolidated form or final state may have an interparticle porosity between the respective solid-state electrolyte particles of less than or equal to about 10 vol. %, optionally less than or equal to about 5 vol. %.

The negative electrode 22 may be formed from a lithium host material that is capable of functioning as a negative terminal of a lithium-ion. In certain aspects, the negative electrode 22 may be a solid film comprising lithium metal. In certain variations, the negative electrode 22 may be elemental lithium or an alloy of lithium. In other variations, the negative electroactive material forming the negative electrode 22 may be silicon-based, for example, a silicon alloy. In yet other variations, the negative electrode 22 may be a carbonaceous material, such as graphite or graphene. In still further variations, the negative electrode 22 may comprise one or more negative electroactive materials, such as lithium titanium oxide ($Li_4Ti_5O_{12}$) and sodium titanium oxide ($Na_4Ti_5O_{12}$); one or more metal oxides, such as $V_2O_5$; and metal sulfides, such as FeS. In alternative aspects not shown in FIG. 1, the negative electrode 22 may be a composite type of electrode having a plurality of negative electroactive material particles distributed within a matrix with an electrolyte and optional electrically conductive particles, as will be described in the context of the positive electrode 24.

The negative electrode current collector 32 may be formed from copper (Cu), stainless steel, or any other electrically conductive material known to those of skill in the art.

While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode. Thus, the positive electrode 24 may be formed from a lithium-based electroactive material that can undergo lithium cycling (e.g., intercalation and deintercalation or plating and deplating) while functioning as the positive terminal of the battery 20. For example, while not limiting, in certain variations, the positive electrode 24 may be defined by the plurality of positive solid-state electroactive particles 36. However, it should be noted that the positive electrode 24 is not limited to the embodiment shown in FIG. 1 and may be in a variety of forms, including a solid electrode, a semi-solid, gas, or liquid electrode.

In certain instances, as illustrated in FIG. 1, the positive electrode 24 is a composite comprising a mixture of the positive solid-state electroactive particles 36 and solid-state electrolyte particles 44 (notably, shown to be of a different particle size than the solid state electrolytes 30 in the separator 26, although these may be of the same size and diameter). For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive solid-state electroactive particles 36 and greater than or equal to about 5 wt. % to less than or equal to about 70 wt. %, and in certain aspects, optionally greater than or equal to about 10 wt. % to less than or equal to about 30 wt. %, of the plurality of solid-state electrolyte particles 44. Such positive electrodes 24 may have an interparticle porosity between the positive solid-state electroactive particles 36 and/or the solid-state electrolyte particles 44 that is less than or equal to about 20 vol. %, optionally less than or equal to about 10 vol. %. As noted above, in certain variations, the plurality of solid-state electrolyte particles 44 may be the same as or different from the of solid-state electrolyte particles 30 in the separator 26, whether by composition or size.

The positive electrode 24 may include a variety of distinct positive electroactive materials that can cycle lithium. In various aspects, the positive electrode 24 may be formed of a positive electroactive material 36 that is one of a layered-oxide cathode, a spinel cathode, or a polyanion cathode. For example, in the instances of a layered-oxide cathode (e.g., rock salt layered oxides), the positive solid-state electroactive particles 36 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries or $NaCoO_2$, $NaMnO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), and $Na_{1-x}MO_2$ (where $0 \leq x \leq 1$) for solid-state sodium-ion batteries. The spinel cathode may include one or more positive electroactive materials, such as $LiMn_2O_4$ and $LiNi_xMn_{1.5}O_4$ for lithium-ion batteries and $NaMn_2O_4$ and $NaNi_xMn_{1.5}O_4$ for sodium-ion batteries. The polyanion cation may include, for example, a phosphate such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries; a phosphate such as $NaFePO_4$, $NaVPO_4$, $NaV_2(PO_4)_3$, $Na_2FePO_4F$, $Na_3Fe_3(PO_4)_4$, or $Na_3V_2(PO_4)F_3$ for sodium-ion batteries; and/or a silicate such as $LiFeSiO_4$ or $NaFeSiO_4$ for lithium- or sodium-ion batteries, respectively. In this fashion, in various aspects, the positive solid-state electroactive particles 36 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof or $NaCoO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), $Na_{1-x}MO_2$ (where $0 \leq x \leq 1$), $NaMn_2O_4$, $NaNi_xMn_{1.5}O_4$, $NaFePO_4$, $NaVPO_4$, $NaV_2(PO_4)_3$, $Na_2FePO_4F$, $Na_3Fe_3(PO_4)_4$, $Na_3V_2(PO_4)F_3$, $NaFeSiO_4$, and combinations thereof. In another aspect, the positive electrode 24 may include elemental sulfur or a sulfur-containing active material. In yet other aspects, additional materials that may be appropriate to provide a desired voltage between the positive electrode 24 and the negative electrode 22 may be used. For example, the positive electrode 24 may be a liquid electrode.

In certain variations, where positive solid-state electroactive particles 36 are used in the positive electrode 24, the particles 36 may be optionally intermingled with one or more electrically conductive materials 38 that provide an electron conduction path and/or at least one polymeric binder material (not shown) that improves the structural integrity of the positive electrode 24. Electrically conductive materials 38 may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain aspects, mixtures of the conductive materials may be used. The positive solid-state electroactive particles 36 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders.

The positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives 38 and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

The positive electrode current collector 34 may be formed from aluminum (Al) or any other electrically conductive material known to those of skill in the art.

As a result of the interparticle porosity and voids 50 that are defined between particles within the battery 20, for example between the solid-state electrolyte particles 30 and the various particles in the positive electrode 24, an amount of contact, even when compressive pressure is applied to the battery 20, may be relatively low as compared to the contact established between a liquid electrolyte and solid-state electroactive particles in comparable non-solid-state batteries. The dearth of contact can lead to higher interfacial impedance and diminished battery performance. In accordance with various aspects of the present disclosure, to improve contact between the solid-state electrolyte and a solid electrode, an interfacial layer of a liquid metal composition is disposed therebetween.

Figure 2:
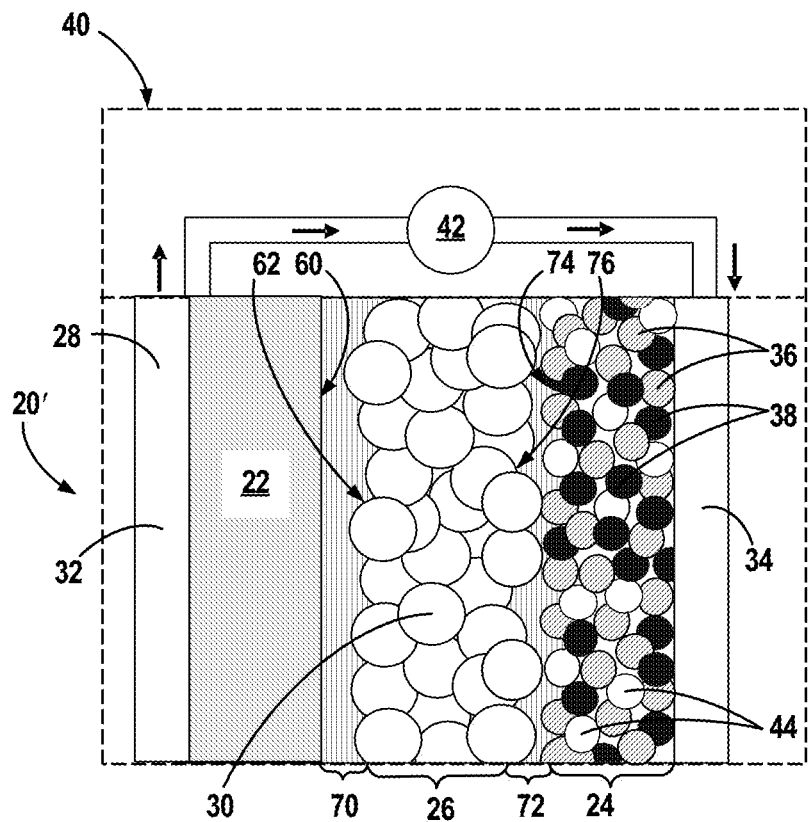
FIG. 2 is an illustration of a solid-state battery prepared in accordance with various aspects of the present disclosure having two distinct interfacial layers of liquid metal between solid electrodes and solid-state electrolytes.

FIG. 2 shows an illustration of an electrochemical cell or battery 20' that cycles lithium ions like battery 20 shown in FIG. 1. Many of the components in battery 20' are the same as those in battery 20 of FIG. 1 and for the sake of brevity, will not be described again herein, but will be understood to share the same composition, function, and the like. In FIG. 2, a negative electrode 22 defines a first major surface 60 defining major dimensions of width and length. The first major surface 60 faces a solid-state electrolyte 26. In view of the fact that the negative electrode 22 is shown as a metal foil design, the first major surface 60 is relatively flat. In other designs, the major surface may be more porous with greater surface roughness, voids, pores and the like. Further, the solid-state electrolyte 26 defines a second major surface 62 having two major dimensions of length and width. The second major surface 62 faces the negative electrode 22. As shown, the second major surface 62 of the solid-state electrolyte 26 is porous and relatively uneven. In accordance with various aspects of the present disclosure, a first interfacial layer 70 is formed between the first major surface 60 of the negative electrode 22 and the second major surface 62 of the solid-state electrolyte. The first interfacial layer 70 is disposed between and coextensive with both the first major surface 60 of the negative electrode 22 and the second major surface 62 of the solid-state electrolyte 26, meaning the substantially all of the surface of the first major surface 60 and the second major surface 62 are in contact with the interfacial layer. The first interfacial layer 70 is formed of a metal composition that is a liquid in a temperature range in which the metal composition is applied. In certain variations, the first interfacial layer 70 may be formed of a metal composition that is a liquid within a range of operating temperature of the battery 20', as will be discussed in greater detail below. The first interfacial layer 70 may be relatively thin, but wets out over the entire surface region defined between the first major surface 60 and the second major surface 62.

As will be discussed further herein, methods for forming such interfacial layers are also provided by the present disclosure that enables formation of a thin interfacial layer between an electrode that comprises an electroactive material and a solid-state electrolyte. The process can apply a thin layer of liquid metal as an interlayer between the solid electrode and solid electrolyte to make intimate interfacial contact (e.g., filling in surface pores and voids), facilitate charge transfer, and reduce the interfacial impedance.

While optional, as shown in FIG. 2, the battery 20' also includes a second interfacial layer 72 that is formed between a third major surface 74 of the positive electrode 24 and a fourth major surface 76 of the solid-state electrolyte 26. As noted above, the positive electrode 24 may be liquid, gas, semi-solid, or solid. However, in the embodiment in FIG. 2, the positive electrode 24 is a solid electrode. The second major surface 62 and the fourth major surface 76 are on opposite sides of the solid-state electrolyte 26. The second interfacial layer 72 fills the surface voids and pores along the third major surface 74 and the fourth major surface 76 of the solid-state electrolyte. This second interfacial layer 72 can further enhance performance of the solid-state battery 20' when it is provided on both sides of the solid-state electrolyte 26.

In certain aspects, the present disclosure contemplates methods of making an electrochemical cell that cycles lithium ions. In certain aspects, the method comprises applying a liquid metal composition to a major surface of either a solid-state electrolyte or a solid electrode, or alternatively to major surfaces of both the solid-state electrolyte and solid electrode. As noted above, the metal composition is advantageously above its melting point and is in a liquid form during the applying process. In certain variations, the applying may be done at ambient conditions, where a temperature may range from greater than or equal to about 20° C. to less than or equal to about 30° C., by way of example. The liquid phase facilitates the wetting out process over the major surface of the solid-state electrolyte and/or solid electrode during the application process to form a continuous coating that defines an interfacial layer. Further, wetting the solid electrolyte and/or solid electrode can be enhanced by treating the liquid metal composition to form a thin layer of surface oxide, as will be described below.

In certain aspects, the applied metal composition defining an interfacial layer may remain as a liquid during a portion of or all of an operational temperature range of the battery 20'. By way of example, in certain aspects, the metal composition may remain in a liquid phase (e.g., have a melting temperature below) a temperature range of greater than or equal to about −20° C. to less than or equal to about 150° C. and optionally from greater than or equal to about −20° C. to less than or equal to about 85° C.

The liquid metal composition may comprise gallium. For example, the liquid metal composition comprising gallium may be elemental gallium or an alloy of gallium and a metal selected from the group consisting of: tin, zinc, indium, bismuth, and combinations thereof. In certain variations, the liquid metal composition comprising gallium may be one or more alloys selected from the group consisting of: GaSn, GaInSn, $GaSn_8$, $GaSn_{12}$, $GaZn_5$, $Ga_{75}In_{25}$, $GaIn_{25}Sn_{13}$, $Ga_{69.8}In_{17.6}Sn_{12.6}$, $Ga_{62.5}In_{21.5}Sn_{16}$, $GaSn_{60}In_{10}$, $GaIn_{29}Zn_4$, $GaZn_{16}In_{12}$, $Ga_{66}In_{20.5}Sn_{13.5}$, $Ga_{66}In_{20.5}Sn_{13.5}$, $Ga_{61.0}In_{25.0}Sn_{13.0}Zn_{10}$, $GaIn_{15}Sn_{13}Zn_1$, $Ga_{66.4}In_{20.9}Sn_{9.7}Zn_3$, $Ga_{6.8}In_{21}Sn_{9.5}Bi_{1.5}$ and $Ga_{6.8}In_{21}Sn_{9.5}Bi_{0.75}Zn_{0.75}$.

In accordance with certain aspects of the present disclosure, the applying of the liquid metal composition is conducted in the presence of an oxidant, for example, oxygen to treat the metal composition to enhance wettability. Further, in certain aspects, of the present disclosure, the applying is conducted in an environment substantially free of water (e.g., moisture). In this manner, the controlled presence of the oxidant serves to create metal oxides on exposed surfaces of the liquid metal composition. In the case of gallium-containing compositions, formation of a thin layer of gallium oxides serves to reduce surface tension of the liquid metal composition, so that it wets out over and forms a continuous layer over the major surface of the solid-state electrolyte, solid electrode, or both. The surface oxides on the liquid metal composition can be understood to act as a surface-active agent between respective electrode material or electrolyte, breaking the surface tension of the liquid metal composition so that it flows and wets out over the surfaces of the electrode material or electrolyte.

Figure 3:
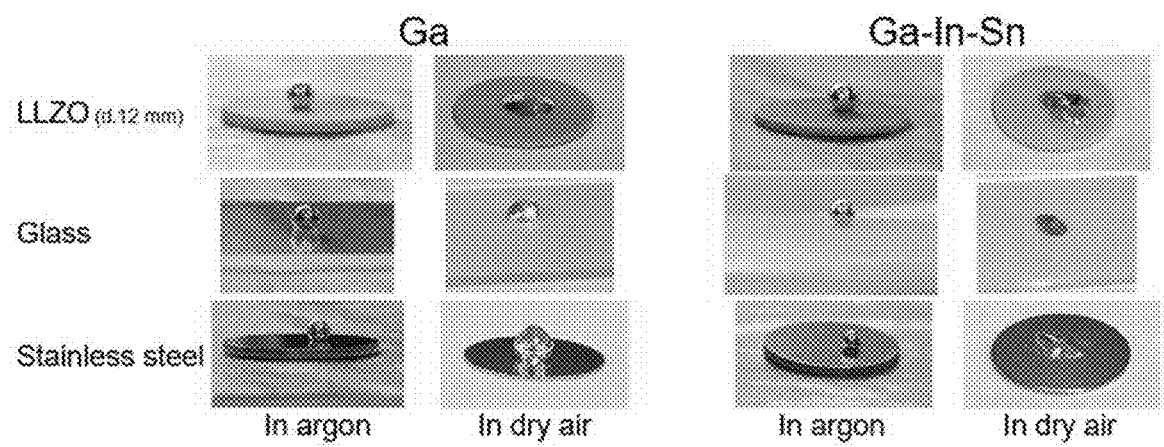
FIG. 3 are pictures showing wetting behavior of liquid gallium (Ga) and liquid Ga—In—Sn alloy on various substrates, including solid electrolyte (e.g., LLZO), glass and stainless steel, in two distinct environments (argon and dry air).

FIG. 3 shows surface tension and wetting behavior of elemental gallium and an alloy of gallium indium tin (Ga—In—Sn) on three substrates, namely LLZO solid-state electrolyte, silica-based glass, and stainless steel in an inert atmosphere of argon and in an atmosphere of dry air with negligible moisture present. As can be seen in FIG. 3, elemental gallium and Ga—In—Sn both have an apparent surface contact angle above 90° on LLZO solid-state electrolyte in argon meaning that they do not wet out over the substrate surfaces. For example, elemental gallium has a high surface tension (approximately 708 mN/m), so that gallium cannot wet LLZO in the inert argon environment. However, when air that comprises oxygen is introduced, the elemental gallium and Ga—In—Sn both wet out over the surface of the LLZO and have an apparent contact angle of less than 5°. In the presence of an oxidant, a thin surface oxide layer forms instantaneously on liquid Ga, so that it wets out on a surface of LLZO in dry air. A similar process occurs for the Ga—In—Sn alloy. It is believed that the formation of the oxide layer on the surface of the gallium-containing metal provides the capability of changing wettability of the metal, thus making it possible for it to be applied in a continuous surface layer covering a major surface of a substrate, like LLZO, so that the gallium-containing metal can be used as an interlayer between LLZO and Li. For application to a glass substrate and a stainless steel, it can be seen that elemental gallium has a high contact angle in argon and further has a diminished, but still relatively high contact angle on glass in dry air. For the Ga—In—Sn alloy, it has a relatively high contact angle on both glass and stainless steel in an inert argon environment, but when a surface layer of oxides form in dry air, it is sufficient for the contact angle to be significantly reduced on the glass and stainless steel, wetting out over the substrates.

One simple measure of wetting on a smooth or non-textured surface is an equilibrium contact angle θ, given by Young's equation as:

$$\cos\theta = \frac{\gamma_{SV} - \gamma_{SL}}{\gamma_{LV}},$$

where a surface tension of the liquid metal is $\gamma_{LV}$, a surface energy of the solid is $\gamma_{SV}$, and a solid-liquid interfacial energy is $\gamma_{SL}$. Surfaces that display contact angles θ less than about 90° with a liquid can be considered to be wetting for the liquid metal. Surfaces that spontaneously approach a contact angle θ of 0° with the liquid metal are generally considered to be extremely wetting (in the context of water liquid, such surfaces are considered to be superhydrophilic). As used herein, liquid metals that display a contact angle θ of less than or equal to about 30° on a select surface, such as a solid-state electrolyte or solid electrode, optionally of less than or equal to about 20°, optionally of less than or equal to about 15°, optionally of less than or equal to about 10°, optionally of less than or equal to about 5°, optionally of less than or equal to about 4°, optionally of less than or equal to about 3°, optionally of less than or equal to about 2°, optionally of less than or equal to about 1°, and in certain aspects, 0° are considered to be highly wetting and capable of forming a continuous liquid metal film over the target substrate and thus capable of forming a continuous interfacial layer that is coextensive with a major surface of the substrate on which it is applied. In certain aspects, the liquid metal may have a surface tension $\gamma_{LV}$ of greater than or equal to about 500 mN/m. By forming a thin oxide layer in accordance with certain aspects of the present disclosure, the surface tension can be reduced down to less than or equal to about 100 mN/m and in certain aspects, less than or equal to about 50 mN/m.

The processes of certain aspects of the present disclosure thus include a step that reduces the surface tension of liquid metal by exposing the metal composition to an oxidant, such as oxygen or potentially nitrogen, which serves to dramatically improve the metal's wettability to solid battery components, like a solid electrolyte. Thus, in various aspects, the applying of the liquid metal composition is done in the presence of an oxidant, for example, oxygen, present at greater than 0% by mass to less than or equal to about 20% by mass of the total atmosphere.

In certain aspects, the process may be conducted so that the oxidant is present when the liquid metal composition is applied to a solid-state electrolyte, but an electrode that is sensitive to exposure to an oxidant, such as lithium, is not present during the step of treating the liquid metal composition. Furthermore, as discussed above, in certain aspects, the environment in which the applying occurs may be substantially free of any water, which can adversely react with certain battery components. The water may react with lithium ions in the solid electrolyte, which by definition are mobile and can reach the surface, where the lithium ions and water may form lithium hydroxide. The charge neutrality in the solid electrolyte or in the surface layer may be maintained by exchanging the lithium ion for the hydrogen ion. The term "substantially free" as referred to herein is intended to mean that water is absent to the extent that undesirable and/or detrimental effects are negligible or non-existent, for example, reactions with electroactive materials like lithium or positive electrode materials. In certain aspects, an environment that is "substantially free" of water comprises less than or equal to about 0.1% by weight, optionally less than or equal to about 0.05% by weight, optionally less than or equal to about 0.01% by weight, optionally less than or equal to about 0.001% by weight, and in certain variations, optionally less than about 0.0001% by weight (which is near less than 1 ppm of water), and in certain aspects, 0% by weight of water.

In certain aspects, the applying may be conducted by a process selected from the group consisting of: thermal evaporation, doctor blade coating, and combinations thereof. Thermal evaporation uses the increase in vapor pressure with temperature of a material to evaporate a source of material, then condenses a layer on a substrate, which is typically substantially cooler than the source material. For example, in a thermal evaporation process, the liquid metal can be placed in a crucible under the vacuum (e.g., $<10^{13}$ torr), and liquid metal can be heated up (>50° C. higher than its melting point) at which point, it becomes a vapor, which would be deposited on a solid electrolyte or electrode surface. Where a thermal evaporation process is used, a thickness of the applied interfacial layer may be greater than or equal to about 5 nm less than or equal to about 100 nm, optionally greater than or equal to about 20 nm less than or equal to about 100 nm.

For doctor blade coating, a liquid metal is applied to a surface that is spread with a doctor blade to a predetermined thickness. The liquid metal composition is applied so that is has a thickness of greater than or equal to about 5 nm to less than or equal to about 20 micrometers, optionally greater than or equal to about 20 nm to less than or equal to about 10 micrometers. For a doctor blade coating process, a thickness of the applied interfacial layer of liquid metal may be greater than or equal to about 5 micrometers to less than or equal to about 20 micrometers, as where when a thermal evaporation process is used, a thickness of the applied interfacial layer comprising liquid metal may be thinner.

The interfacial layer is ionically conductive to permit lithium or other ions to pass, while also being electrically conductive. As appreciated by those of skill in the art, conductivity or resistance can vary based on the liquid metal composition. Furthermore, resistance increases as a thickness of the interfacial layer of liquid metal increases. In certain aspects, the interfacial layer comprising the liquid metal composition when incorporated into the electrochemical cell has a resistivity of less than or equal to about 2 Ohm/cm$^2$, and in certain variations, optionally less than or equal to about 1 Ohm/cm$^2$. The ionic conductivity of the solid electrolyte may range from greater than or equal to about $10^{-4}$ S/cm to less than or equal to about $10^{-2}$ S/cm at room temperature (e.g., between 20-25° C.).

In certain aspects, the substrate on which the liquid metal composition is applied may be heated, such as a solid-state electrolyte that is heated prior to or during the applying. This may be performed to release adsorbed or reacted material and provide a clean surface, or to assist in wetting the surface with the liquid metal. The heating would be less than the melting or decomposition temperature of the substrate, for example, typically less than or equal to about 150° C. or for ceramic electrolytes that have been heat treated, less than or equal to about 400° C. or optionally less than or equal to about 300° C. This further enhances the melting and flowability of the liquid metal composition during the application process.

In other aspects, the substrate (either the solid-state electrolyte or electrode) on which the liquid metal composition is applied may be pretreated to enhance wettability of the surface prior to applying the liquid metal composition. This pretreatment may be any method to either remove a surface contamination layer or add a new layer onto the substrate, including by heat treatment, cleaning processes such as chemical etching or ion milling, polishing, or the application of a surface layer, including layers such as metals or metal oxides deposited by atomic layer deposition (ALD), sputtering or other similar methods.

In certain variations, the interfacial layer comprising the metal composition is formed only of the metal composition and is substantially free of any other components, for example, free of any electroactive materials aside from the liquid metal composition, electrically conductive materials, and the like. Thus, the interfacial layer may comprise greater than or equal to about 99 to about 100% by weight of the liquid metal composition.

In certain aspects, where a solid electrode comprises lithium, the presence of an interfacial layer comprising a liquid metal composition can advantageously reduce or eliminate formation of lithium dendrites. In one example, the dendrites may form due to loss of contact and subsequent loss of a conductive path between lithium metal and the solid electrolyte. In this example, the contact may be made by maintaining pressure significantly above the yield strength of lithium, roughly at greater than or equal to about 0.5 MPa to less than or equal to about 0.8 MPa, with the pressure required being dependent on the operating conditions and rate of charge transfer. This present technology may be used to reduce the required pressure to less than the yield strength of lithium by allowing the liquid metal to maintain contact.

Example 1

Two test cells are formed for comparison. A test cell prepared in accordance with certain aspects of the present disclosure comprises a first lithium metal foil disk, a first liquid gallium metal interfacial layer, an LLZO solid-state electrolyte, a second liquid gallium metal interfacial layer adjacent the LLZO solid-state electrolyte, and a second lithium metal foil disk control adjacent to the opposite side of the second liquid gallium metal interfacial layer. The gallium is applied onto LLZO surface using a doctor blade. The thickness is controlled to be less than 100 µm. The liquid gallium metal is placed on both surfaces of a solid-state electrolyte (LLZO) pellet in the open atmosphere in a short time (<30 seconds) and then transferred into glovebox. Two lithium metal (Li) disks with diameter of 16 mm are attached to the liquid metal coated LLZO pellet and then put into a coin cell case as a symmetric cell. A comparative test or control cell has an uncoated LLZO pellet with two Li disks assembled as the other symmetric cell to compare impedance.

Figure 4:
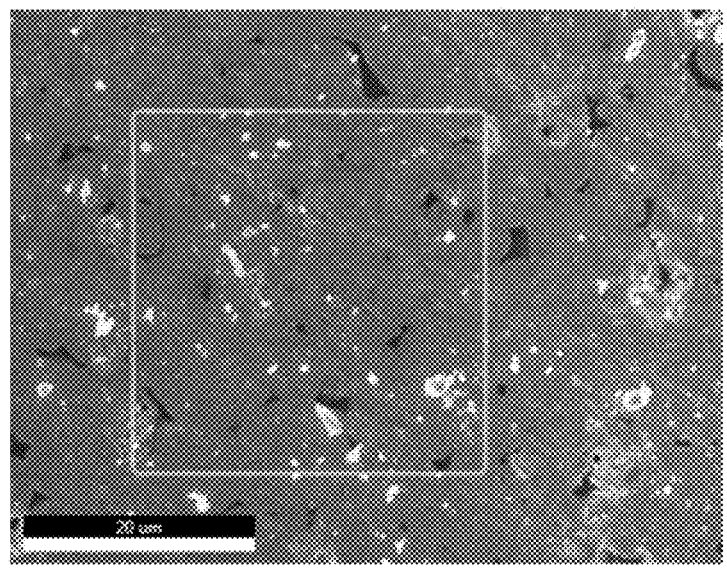
FIG. 4 shows a scanning electron microscopy (SEM) image of an LLZO solid-state electrolyte having a surface coated with a liquid gallium coating in accordance with certain aspects of the present disclosure.
Figure 5:
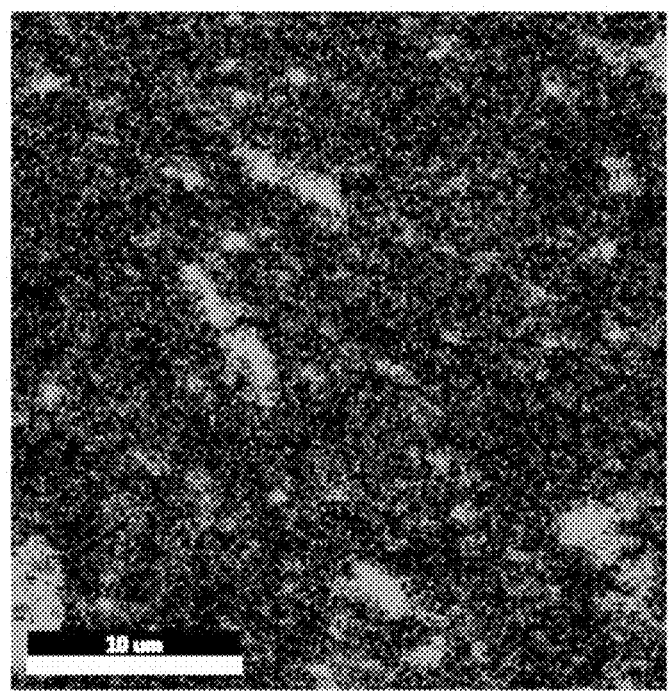
FIG. 5 shows an image of the liquid gallium distribution over a coated LLZO solid-state electrolyte surface in FIG. 4, as measured by energy-dispersive X-ray spectroscopy (EDS).

FIG. 4 shows an SEM image of an LLZO solid-state electrolyte having a surface coated with a liquid gallium coating. FIG. 5 shows an image of the liquid gallium evenly distributed over the coated LLZO solid-state electrolyte surface in FIG. 4, as measured by energy-dispersive X-ray spectroscopy (EDS). Note that gallium is observed covering the entire surface, with some variations in thickness of the coating.

Figure 6:
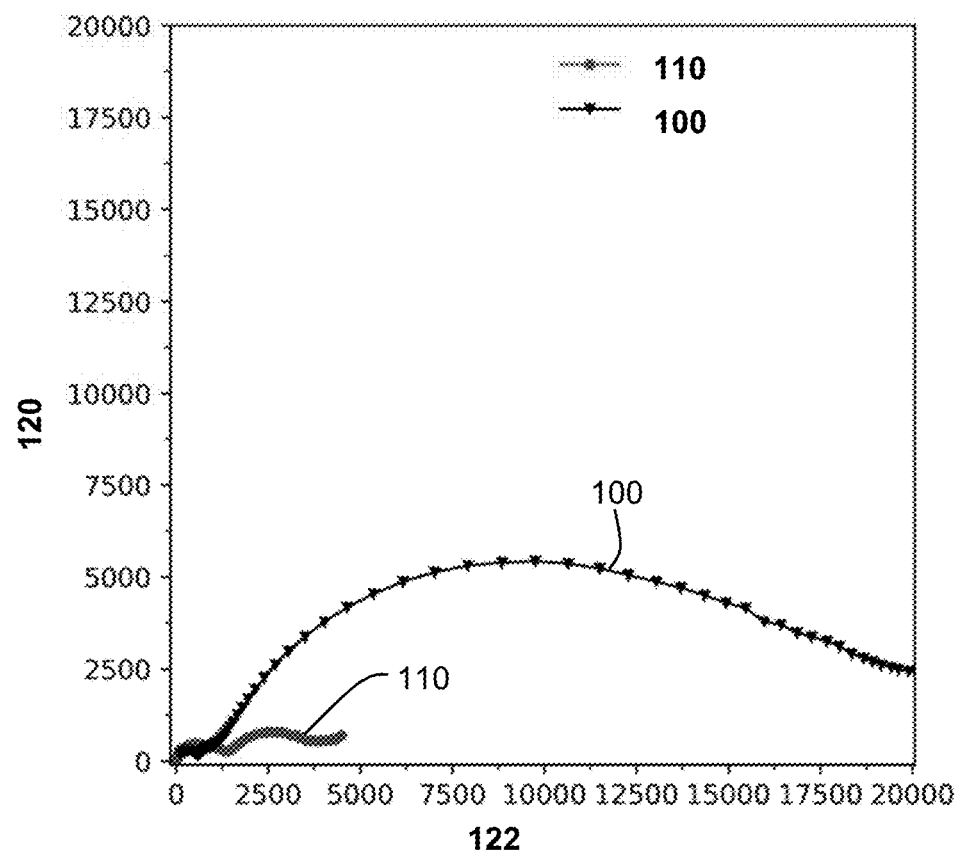
FIG. 6 shows impedance of a comparative test cell having an LLZO solid-state electrolyte disposed between two respective lithium metal foils as compared to an electrochemical cell prepared in accordance with certain aspects of the present disclosure having an LLZO solid-state electrolyte coated with two distinct liquid gallium interfacial layers that are disposed between lithium metal foils.

FIG. 6 shows impedance of the comparative test cell 100 and cell prepared in accordance with certain aspects of the present teachings 110. The y-axis 120 represents –Z" (Ohms) and the x-axis 122 represents Z' (Ohms). As can be seen in FIG. 6, the impedance of cell 120 having the liquid gallium interfacial layers between the solid-state LLZO electrolyte and lithium metal is greatly reduced as compared to the comparative test cell 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a solid-state electrochemical cell that cycles lithium ions, the method comprising:
    applying a liquid metal composition comprising gallium that is a liquid at least within a temperature range of greater than or equal to about 20° C. to less than or equal to about 30° C. to a first major surface of either a solid-state electrolyte or a solid electrode in the presence of an oxidant and in an environment substantially free of water to reduce surface tension of the liquid metal composition so that it forms a continuous layer over the first major surface; and
    contacting the first major surface having the continuous layer of liquid metal composition with a second major surface of the other of the solid-state electrolyte or the solid electrode, such that the continuous layer defines an interfacial layer between the solid-state electrolyte and the solid electrode and contacts all of the first major surface and the second major surface.

2. The method of claim 1, wherein the solid-state electrolyte is heated prior to or during the applying.

3. The method of claim 1, wherein the applying is a process selected from the group consisting of: thermal evaporation, doctor blade coating, and combinations thereof.

4. The method of claim 1, wherein during the applying, a surface tension of the liquid metal composition is less than or equal to about 100 mN/m.

5. The method of claim 1, wherein a contact angle of the liquid metal composition on the first major surface is less than or equal to about 90°.

6. The method of claim 1, wherein a contact angle of the liquid metal composition on the first major surface is less than or equal to about 5°.

7. The method of claim 1, wherein the interfacial layer has a thickness of greater than or equal to about 5 nm to less than or equal to about 20 micrometers.

8. The method of claim 1, wherein the solid-state electrolyte comprises a material selected from the group consisting of: $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), $Li_xLa_{2/3-x}TiO_3$, $Li_{1+x}Al_xTi_{2-x}(PO_4)_3$, $Li_{10}GeP_2S_{12}$, and combinations thereof and the solid electrode comprises lithium.

9. The method of claim 1, wherein the liquid metal composition comprising gallium is elemental gallium or an alloy of gallium and a metal selected from the group consisting of: tin, zinc, indium, bismuth, and combinations thereof.

10. The method of claim 1, wherein the liquid metal composition comprising gallium is selected from the group consisting of: GaSn, GaInSn, $GaSn_8$, $GaSn_{12}$, $GaZn_5$, $Ga_{75}In_{25}$, $GaIn_{25}Sn_{13}$, $Ga_{69.8}In_{17.6}Sn_{12.6}$, $Ga_{62.5}In_{21.5}Sn_{16}$, $GaSn_{60}In_{10}$, $GaIn_{29}Zn_4$, $GaZn_{16}In_{12}$, $Ga_{66}In_{20.5}Sn_{13.5}$, $Ga_{61}In_{25}Sn_{13}Zn_1$, $GaIn_{15}Sn_{13}Zn_1$, $Ga_{66.4}In_{20.9}Sn_{9.7}Zn_3$, $Ga_{68}In_{21}Sn_{9.5}Bi_{1.5}$, $Ga_{68}In_{21}Sn_{9.5}Bi_{0.75}Zn_{0.75}$, and combinations thereof.

11. A solid-state electrochemical cell that cycles lithium ions, the electrochemical cell comprising:
   a solid-state electrolyte defining a first major surface;
   a solid electrode comprising an electroactive material and defining a second major surface; and
   an interfacial layer disposed between and coextensive with the first major surface of the solid-state electrolyte and the second major surface of the solid electrode, wherein the interfacial layer is formed of a metal composition comprising gallium that is a liquid at least within a temperature range of greater than or equal to about 20° C. to less than or equal to about 30° C. and is continuous and contacts all of the first major surface and the second major surface.

12. The solid-state electrochemical cell of claim 11, wherein the solid electrode comprises lithium metal.

13. The solid-state electrochemical cell of claim 11, wherein the solid-state electrolyte comprises a material selected from the group consisting of: $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), $Li_xLa_{2/3-x}TiO_3$, $Li_{1+x}Al_xTi_{2-x}(PO_4)_3$, $Li_{10}GeP_2S_{12}$, and combinations thereof and the solid electrode comprises lithium.

14. The solid-state electrochemical cell of claim 11, wherein the interfacial layer has a thickness of greater than or equal to about 5 nm to less than or equal to about 20 micrometers.

15. The solid-state electrochemical cell of claim 11, wherein the interfacial layer has a resistivity of less than or equal to about 2 Ohm/cm².

16. The solid-state electrochemical cell of claim 11, wherein exposed surfaces of the interfacial layer comprise metal oxides.

17. The solid-state electrochemical cell of claim 11, wherein the metal composition comprising gallium is selected from the group consisting of: GaSn, GaInSn, $GaSn_8$, $GaSn_{12}$, $GaZn_5$, $Ga_{75}In_{25}$, $GaIn_{25}Sn_{13}$, $Ga_{69.8}In_{17.6}Sn_{12.6}$, $Ga_{62.5}In_{21.5}Sn_{16}$, $GaSn_{60}In_{10}$, $GaIn_{29}Zn_4$, $GaZn_{16}In_{12}$, $Ga_{66}In_{20.5}Sn_{13.5}$, $Ga_{61}In_{25}Sn_{13}Zn_1$, $GaIn_{15}Sn_{13}Zn_1$, $Ga_{66.4}In_{20.9}Sn_{9.7}Zn_3$, $Ga_{68}In_{21}Sn_{9.5}Bi_{1.5}$, $Ga_{68}In_{21}Sn_{9.5}Bi_{0.75}Zn_{0.75}$, and combinations thereof.

18. The solid-state electrochemical cell of claim 11, wherein the interfacial layer comprising the metal composition is substantially free of any other components.

19. The solid-state electrochemical cell of claim 11, wherein the temperature range is greater than or equal to about −20° C. to less than or equal to about 150° C.

20. A solid-state electrochemical cell that cycles lithium ions, the electrochemical cell comprising:
   a solid-state electrolyte defining a first major surface and an opposite second major surface;
   a negative solid electrode comprising a negative electroactive material and defining a third major surface;
   a positive solid electrode comprising a positive electroactive material and defining a fourth major surface;
   a first interfacial layer disposed between and coextensive with the first major surface of the solid-state electrolyte and the third major surface of the negative solid electrode, a second interfacial layer disposed between and coextensive with the second major surface of the solid-state electrolyte and the fourth major surface of the positive solid electrode, wherein the first interfacial layer and the second interfacial layer are formed of a metal composition comprising gallium that is a liquid in a temperature range of greater than or equal to about 20° C. to less than or equal to about 30° C.

* * * * *